Dec. 26, 1950  C. E. HOOK ET AL  2,535,207
SAFETY SWITCH
Filed Dec. 3, 1948
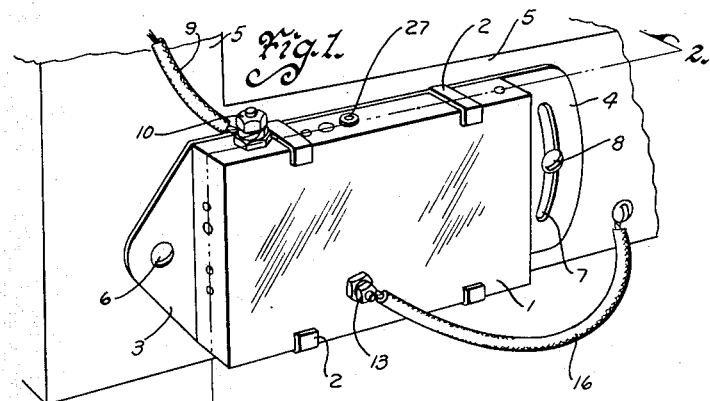
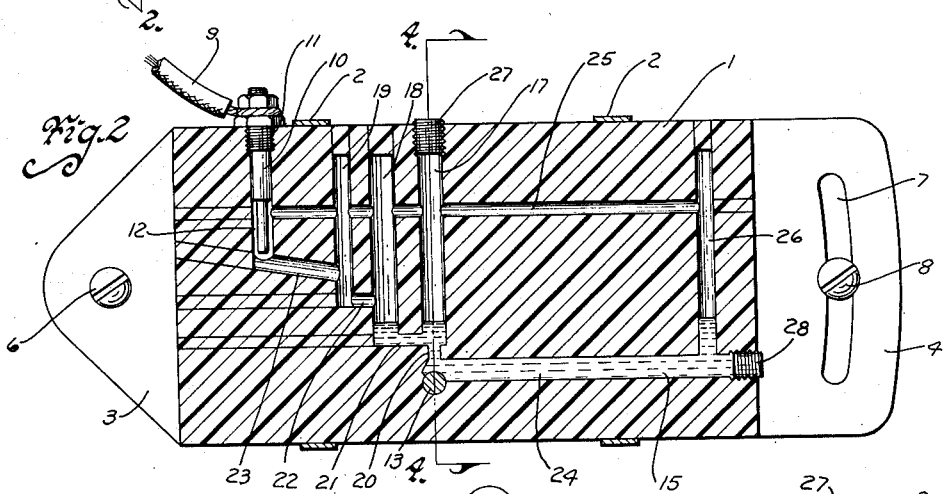
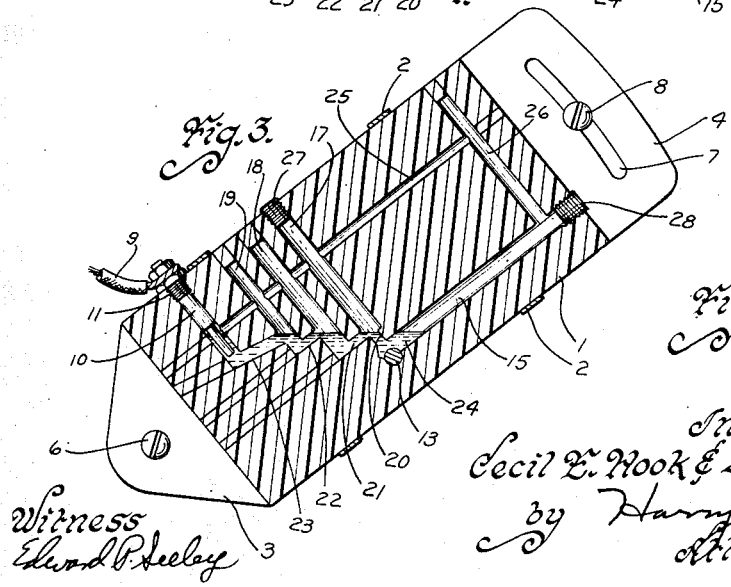
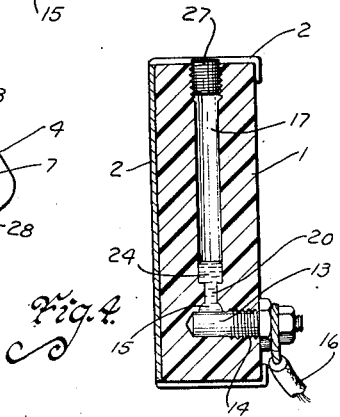
Inventors
Cecil E. Hook & Zenus E. Hook
by Harry L. Yunger
Attorney
Witness
Edward P. Seeley Patented Dec. 26, 1950

2,535,207

UNITED STATES PATENT OFFICE 2,535,207

SAFETY SWITCH

Cecil E. Hook and Zenus E. Hook,
Des Moines, Iowa

Application December 3, 1948, Serial No. 63,248

6 Claims. (Cl. 200—52)

This invention relates to a safety switch to be attached to a vehicle which safety switch operates to stop an engine of a vehicle when the vehicle is tilted or starts to lift the front end of the vehicle so the vehicle does not turn over on the operator.

In the operation of vehicles, particularly tractors as used on farms, if the rear wheels get stuck, there is great potential danger to an operator if he continues to try to pull the tractor out of the rut in which it is stuck. The wheels of the tractor have sufficient traction that they will not slip and turn and the feeding of the gasoline to the engine, usually by a governor, makes the tractor climb the gears, raising the front end to the point where the tractor will turn over. Few operators escape where a tractor is thus turned over and the injuries are usually fatal. The front end raises so fast that the operator is unable to shut off the ignition of the engine or to throw the tractor out of gear.

It is an object of the invention to provide a safety switch that will turn off the ignition of a tractor engine automatically when the front end of the tractor raises to a predetermined angle.

It is another object of the invention to provide a safety switch for mounting on a tractor that is foolproof in its operation; that is economical in operation; that does not require an operator to do anything to make it operate thus eliminating the human element; a safety switch containing no parts to get out of order; and a safety switch that can be furnished at a nominal cost.

Other objects and advantages of the invention will be apparent during the course of the following description.

In the accompanying drawings, forming a part of this specification, and in which like numerals are employed to designate like parts throughout the same.

Figure 1 is a perspective view of the safety switch shown mounted on the framework of a tractor.

Figure 2 is a sectional view taken on the line 2—2 of Figure 1.

Figure 3 is a sectional view as in Figure 2 but showing the safety switch tilted.

Figure 4 is a sectional view taken on the line 4—4 of Figure 2.

The safety switch is contained in a body member 1 and Figure 2 shows approximately actual size of the safety switch. The body member may be made of any suitable non-conductor material and any number of plastic materials have been found that are suitable for the purpose. If made of plastic material, the body member may be molded and the openings cast or drilled, whichever is the more economical. A sheet metal frame 2 surrounds the body member 1 and has bracket projections 3 and 4 extending from each end of the frame 2 to attach the body member 1 and frame 2 to the framework 5 of a vehicle. The bracket 3 has a screw 6 extending through the frame into the framework 5 to attach one end of the frame 2 to the framework 5. The bracket 4 has a slot 7 to receive a screw 8 to attach the other end of the frame 2 to the framework 5. When the safety switch is first mounted on the vehicle it is mounted so as to be level with the surface of the ground over which the vehicle travels hence the slot 7 allows for the safety switch to be adjusted to a level position before screw 8 is tightened.

The electric conductor 9 runs to the ignition system for the vehicle and connects particularly to the magneto which supplies the electric spark to the cylinders of an internal combustion engine (not shown). The conductor 9 connects to a terminal 10 screwed into an opening 11 in the body member 1. The terminal 10 extends into a vertically extending channel 12 within the body member 1. A second terminal 13 is screw threaded at 14 into the side of the body member 1 and extends into a horizontally extending channel 15. The second terminal 13 connects to conductor 16 which in turn is electrically connected to the vehicle framework 5.

The body member 1 has a series of interconnecting channels within the body member 1. A series of vertical channels 17, 18 and 19 lie in the body member 1 between the terminals 11 and 13. The channel 17 connects with the horizontally extending channel 15 by a channel 20. A horizontally extending channel 21 connects channel 17 with channel 18 and horizontally extending channel 22 connects channels 18 and 19. An inclined channel 23 connects channel 19 with channel 12 containing the first terminal 10. The channels 15, 20, 17, 21, 18, 22, 19 and 23 form a line of communication from the terminal 13 to the terminal 10.

The channels 15, 20, 17 and 18 are partially filled with a liquid that is a conductor and in the present instance mercury 24 has been chosen. As can be seen in Figure 2, when the safety switch has not been tilted, the mercury 24 contacts the terminal 13 but does not contact the terminal 10 hence in this position there can be no flow of current through the safety switch.

If the vehicle such as a farm tractor becomes stuck in the mud and the governor continues to feed power to the engine with the front end rising, the safety switch will be lifted to the position of Figure 3. In this position the mercury has flowed from channel 15 to channel 20 into channels 17 and 18 where it rises to the channel 22. From the channel 22 it flows into channel 19 and finally enters channel 23 from where it flows into channel 12 and contacts terminal 10. Flow of electric current is now established through mercury 24 from terminal 10 to terminal 13. The ignition system is now shorted as electric current flows to the framework of the vehicle 5 and is dissipated. The engine of the vehicle is stopped and the front end of the vehicle falls by gravity with no injury to an operator.

It is noted that the line of communication between the terminals 10 and 13 presents a tortuous path in that the mercury does not have a straight line flow. It has been found that in tractor operation especially, the surfaces traveled over are rough and mercury being a heavy liquid, with stopping and starting of the tractor and the jiggling of the tractor in operation the mercury may be set into motion and gain enough inertia to contact both terminals 10 and 13 and stop the tractor engine inadvertently. The vertically extending channels 17, 18 and 19 are each made so as to have different effective heights so that the inertia that the mercury may acquire can be dampened down before it contacts terminal 10. Therefore the only way that the mercury will contact terminal 10 is for the tractor and safety switch to tilt to the position of Figure 3.

The channel 23 is made at an incline of twenty per cent so that all mercury will be drained away from terminal 10 to insure that no arcing will occur.

A horizontally extending channel 25 connects into channels 12, 19, 18, 17 and a vertically extending channel 26 which connects into channel 15 to provide a closed channel circuit within the body member 1. The channel closed circuit gives plenty of breather space to be filled with air and there is absolutely no chance of the system becoming air locked. If the channels are cast or drilled into the body member, the ends of the channels must be suitably closed by plug members. One plug member 27 is removable from the body member 1 and connects into channel 17 to provide an entrance for supply of mercury. A plug 28 closes channel 15 and is removable to drain the mercury from the body member 1 if for any reason it is desired to drain the mercury from the body member 1.

The body member 1 and channels therein may be so calibrated that mercury 24 will contact both terminals 10 and 13 at any degree of rise for the front end of a tractor desired. The rise can be anywhere from 20 degrees to 37½ degrees before the engine is cut off and the drop back down of the front end of the tractor is not so great as to cause any damage to the tractor.

It is to be understood that the form of our invention, herewith shown and described, is to be taken as a preferred example of the same, and that various changes in the shape, size and arrangement of parts may be resorted to, without departing from the spirit of my invention, or the scope of the subjoined claims.

Having thus described our invention, we claim:

1. A safety switch comprising a body member having a pair of terminals mounted therein, a series of horizontally and vertically extending channels in said body member, said terminals extending into the channels with the channels communicating between the two terminals, a liquid in the channels normally contacting one of said terminals, the series of vertically extending channels being between the two terminals and in the line of communication between the two terminals and said liquid flowing in the channels when said body member is tilted to cover the second one of said terminals while said first terminal remains covered.

2. A safety switch comprising a body member having a pair of terminals mounted therein, a series of horizontally and vertically extending channels formed in said body member, said terminals extending into the channels with the channels communicating between the two terminals, a liquid in the channels normally contacting a first one of said terminals, the series of vertically extending channels being between the two terminals and in the line of communication between the two terminals, said vertically extending channels being spaced apart and of different lengths to present a tortuous path in the line of communication, and said liquid flowing in the channels when said body member is tilted to cover the second one of said terminals while said first terminal remains covered.

3. A safety switch comprising a body member having a pair of terminals mounted therein, a series of horizontally and vertically extending channels formed in said body member, said terminals extending into the channels with the channels communicating between the two terminals, a liquid in the channels normally contacting the first one of said terminals, the series of vertically extending channels being between the two terminals and in the line of communication between the two terminals, said vertically extending channels being spaced apart and of different lengths to present a tortuous path in the line of communication, and a channel between the last vertically extending channel and the second one of said terminals extending upwardly at an incline, with said liquid flowing in the channels when said body member is tilted to cover said second terminal while said first terminal remains covered.

4. A safety switch comprising a body member having a pair of terminals mounted therein, a series of vertically extended channels formed in said body member including a pair of outer channels and an intermediate channel, a series of vertically spaced horizontally extended channels in said body member, with the lower ends of said vertical channels terminating at said horizontal channels to inter-connect all of said channels, with one of said terminals being positioned within the upper end of one of said outer vertical channels and the second one of said terminals within the lower end of the other of said outer vertical channels, and an electrically conducting liquid within the channels normally contacting said second terminal.

5. A safety switch comprising a body member having a pair of terminals mounted therein, said body member being formed with a row of upright channels and a series of vertically spaced horizontal channels, with said upright channels having their lower ends terminating at said horizontal channels so that the junctions of said vertical channels with said horizontal channels define a connecting channel of a step formation, with said terminals being located at opposite ends of said connecting channel, and mercury within said channels normally contacting the terminal at the lower end of said connecting channel.

6. A safety switch comprising a body member having a pair of terminals mounted therein, said body member being formed with a series of upright channels of progressively increasing length and a corresponding series of vertically spaced horizontal channels, with said upright channels having the lower ends thereof terminating at their corresponding horizontal channels and with each horizontal channel being extended between adjacent upright channels, with one of said terminals being positioned within the upper end of the shortest one of said upright channels, and the other terminal within the lower end of the longest one of said upright channels, and mercury within said channels normally contacting said other terminal.

CECIL E. HOOK.
ZENUS E. HOOK.

REFERENCES CITED

The following references are of record in the file of this patent:

UNITED STATES PATENTS

| Number | Name | Date |
|---|---|---|
| 822,269 | Geisenhoner | June 5, 1906 |
| 1,633,386 | Rutledge | June 21, 1927 |
| 1,681,756 | Whitlow | Aug. 21, 1928 |
| 1,931,967 | Steiner | Oct. 24, 1933 |
| 2,056,052 | Mason | Sept. 29, 1936 |